Jan. 15, 1957  S. W. LONG  2,777,670
ROLLER KELLY BUSHING
Filed Dec. 15, 1952  2 Sheets-Sheet 1
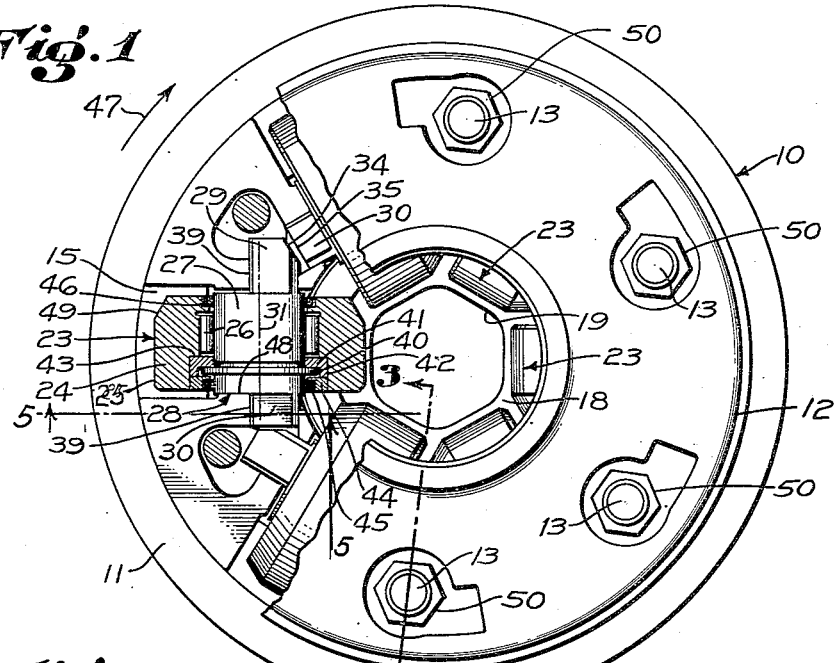
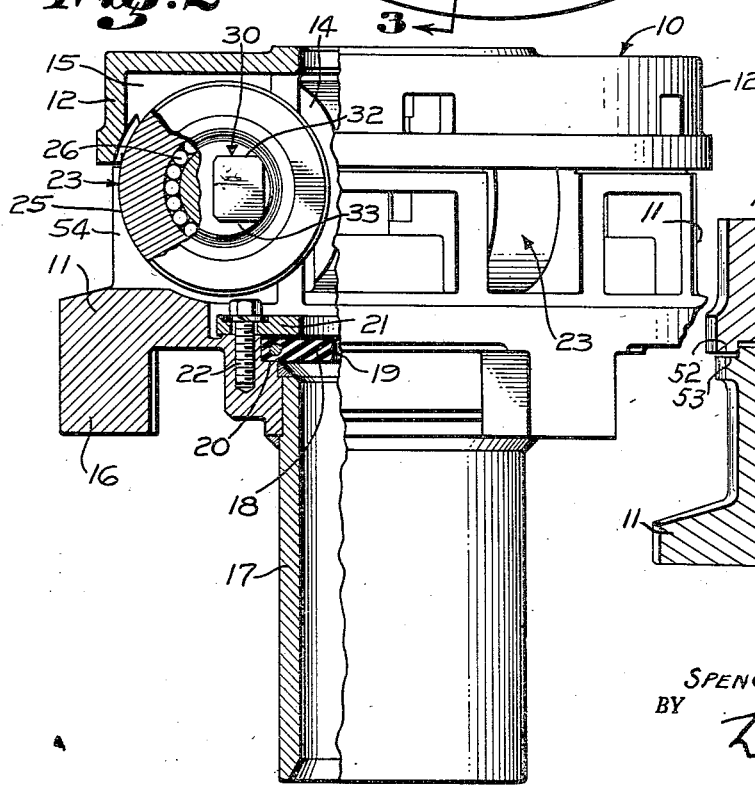
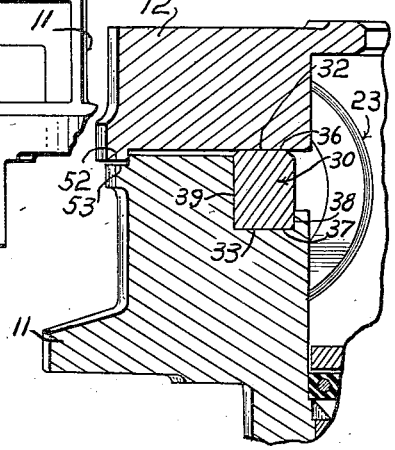
INVENTOR
SPENCER W. LONG
BY
Lyon & Lyon
ATTORNEYS Jan. 15, 1957 S. W. LONG 2,777,670
ROLLER KELLY BUSHING
Filed Dec. 15, 1952 2 Sheets-Sheet 2
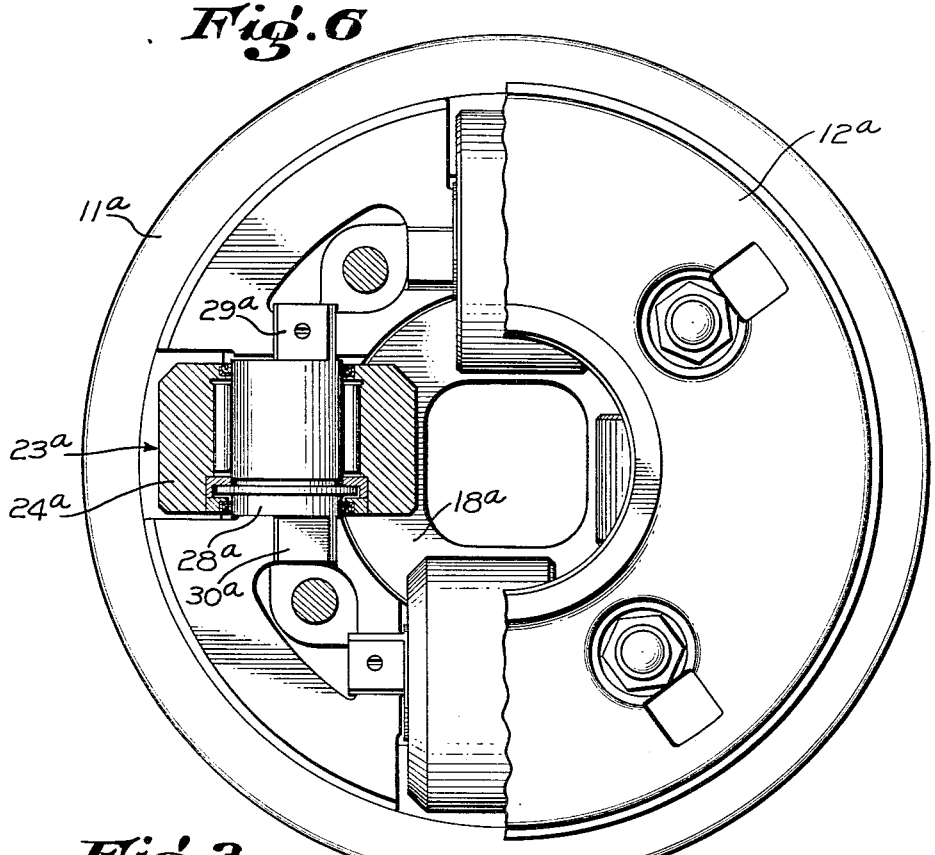
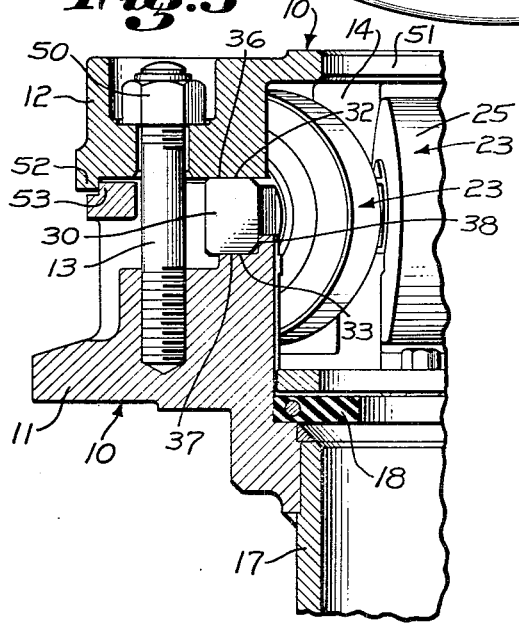
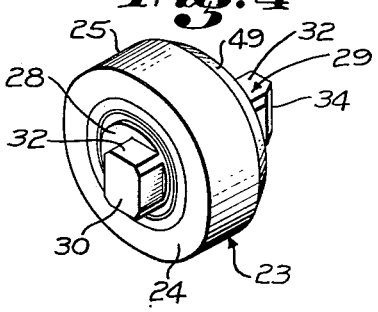
INVENTOR.
SPENCER W. LONG
BY Lyon & Lyon
ATTORNEYS

United States Patent Office 2,777,670
Patented Jan. 15, 1957

2,777,670

ROLLER KELLY BUSHING

Spencer W. Long, Inglewood, Calif., assignor to The National Supply Company, Pittsburgh, Pa., a corporation of Pennsylvania Application December 15, 1952, Serial No. 325,975

1 Claim. (Cl. 255—23)

This invention relates to the well drilling art and is directed to improvements in apparatus for turning the drill string. This invention finds particular usefulness in connection with a Kelly drive bushing.

It is desirable to provide rollers for driving the kelly in order to reduce frictional resistance to axial movement of the kelly. A single large diameter roller is preferably provided to engage each of the faces of the kelly. Thus four rollers are provided for a square kelly and six for a hexagonal kelly, etc. Since the parts of the drive bushing are subjected to heavy loading, high impact forces, vibration and reversing stresses it is essential that the various components of the assembly be simple and rugged in design in order to withstand the severe operating conditions in service. Moreover the parts must not wear excessively even when exposed to mud fluid of the type employed in the drilling of wells. Accordingly it is the principal object of my invention to provide an improved form of Kelly drive bushing which bushing embodies components which are rugged in design and capable of operating under severe service conditions for long intervals of time.

Another object is to provide a roller drive bushing assembly for a kelly which assembly is provided with a frame or base transversely divided into two halves which function to clamp non-circular portions of roller shafts therebetween.

Another object is to provide a device of this type in which the non-circular ends of the roller shafts are placed off center with respect to the shaft axes so that the shafts may be inverted and thereby change the spacing of the shaft axes with respect to the center line of the kelly.

A more detailed object is to provide a novel form of self-enclosed bearing mounting for a drive roller including means for absorbing end thrust.

Other and more detailed objects and advantages will appear hereinafter.

In the drawings:

Figure 1 is a plan view partly broken away and partly in section showing a first embodiment of my invention.

Figure 2 is a side elevation thereof partly broken away and partly in section.

Figure 3 is a sectional elevation taken substantially on the lines 3—3 as shown in Figure 1.

Figure 4 is a perspective view of one of the roller assemblies.

Figure 5 is a sectional detail taken on the lines 5—5 as shown in Figure 1.

Figure 6 is a plan view partly in section and partly broken away showing a second embodiment of my invention.

Referring to the drawings:

The bushing assembly generally designated 10 includes a body 11 and a cover 12 connected by threaded elements 13. The body 11 and cover 12 cooperate to define a central opening 14 and a plurality of recesses 15 radiating therefrom for the reception of drive rollers described below. The body is provided with a plurality of drive lugs 16 which are adapted to be engaged by driving parts of a rotary table not shown. The body is supported on the rotary table and turned by means of the lugs 16. A depending skirt 17 is fixed centrally to the body and serves as a pilot for engagement of the driving lugs 16 in the manner set forth in the prior patent to Forrest J. Young No. 2,422,383 issued June 17, 1947. A rubber disc 18 having a central opening 19 is mounted on a shoulder 20 on the body 11 and is held in place by means of a retainer plate 21 and threaded elements 22.

In accordance with my invention a roller assembly generally designated 23 is mounted in each of the recesses 15 and extends into the central opening or cavity 14. Each of the assemblies 23 includes a drive roller 24 having a cylindrical driving surface 25 for engagement with one face of a kelly, not shown. The roller bearing assembly 26 supports each drive roller 24 on the cylindrical portion 27 of a stationary pin or shaft 28. Trunnions 29 and 30 formed integrally with the shaft 28 project axially from the cylindrical portion 27 but are mounted off center with respect to the roller axis 31. These offset trunnions 29 and 30 are non-circular in shape and are preferably provided with parallel horizontal surfaces 32 and 33. The trunnions 29 and 30 are offset radially from the roller axis 31. One end 34 of each trunnion 29 may be cut away at an angle to provide clearance with respect to the end 35 of an adjacent trunnion 30 as shown in Figure 1. Parallel surfaces 32 and 33 of the trunnions are engaged by parallel clamping surfaces 36 and 37 provided on the cover 12 and body 11 respectively. Threaded elements 13 thus serve to clamp the trunnions between body 11 and cover 12. Shoulders 38 and 39 on the body 11 engage vertical side faces of the trunnions to prevent radial movement of the roller away from the kelly. The shoulders 39 (Fig. 5) are of a height only slightly less than that of the vertical side faces of the trunnions 29 and 30; whereas, the shoulders 38 are of relatively low height and cooperate therewith to form pockets for the trunnions that open into the central opening 14. It will also be noted that the means defining the shoulders 38 borders on the peripheral edge of the central opening 14. The same body and cover may therefore be used with a number of different drive roller assemblies in order to accommodate kellys of different sizes. The drive roller assemblies may have trunnions offset by different amounts and the trunnions may be located either radially inwardly or radially outwardly of the roller axes, as required.

Each of the shafts or pins 28 is provided with an integral flange 40. Bronze ring 41 is received within a counterbore 42 in the drive roller and engages a thrust shoulder 43. The bronze ring 41 is held in position by means of a retainer ring 44 fixed to the drive roller 24 by any convenient means. An annular seal element 45 is carried by the retainer ring 44. A second annular seal element 46 is mounted directly on the drive roller. These annular seal elements 45 and 46 serve to exclude foreign matter and retain lubricant for the bearing assembly 26 and the thrust ring 41. Lubricant may be introduced into the bearing assembly 26 through a suitable pressure fitting (not shown) mounted on one of the trunnions and communicating with the bearing 26 by means of a passageway in the shaft 28.

The direction of rotation of the bushing assembly 10 is shown by the arrow 47 in Figure 1. The axial component of the force exerted by the kelly on roller face 25 is thus transmitted through the shoulder 43 and ring 41, to the flange 40 on the shaft 28. This thrust load is then transferred through the abutting surfaces 48 to the body 11.

The bevelled or conical portion 49 of each drive roller does not engage the kelly. It is cut away to provide clearance and to avoid interference with the adjacent drive roller.

When it is desired to install the drive bushing assembly 10 on the kelly (not shown) the nuts 50 are removed from the elements 13 and the cover 12 is lifted away from the body 11. The roller assemblies 23 are removed. The kelly is then inserted endwise through the aperture 51 in the cover and through the interior of the body skirt 17. The roller assemblies 23 are then placed in position between the clamping surfaces 36 and 37. This method of assembly is necessary in order that the enlarged collars which are customarily formed integrally at each end of the kelly may pass through the center cavity 14. When the drive roller assemblies 23 are in position within their respective recesses 15, the nuts 50 which are engaged with the elements 13 are tightened to clamp the trunnions 29 and 30 in position against displacement. Interengaging parts 52 and 53 provide alignment between the body 11 and cover 12.

After installation of the drive bushing assembly 10 on the kelly, the kelly may be lowered into the central opening on a rotary table, as will be understood by those skilled in the art, and the skirt 17 serves to pilot the bushing 10 and collar into central position. Rotary movement of the table then serves to bring the driving lugs 16 into operating position.

The rubber disc 18 maintains wiping contact with the drive faces of the kelly in order to reduce to a minimum the amount of mud fluid carried into the cavity 14 when the kelly is raised upward through the bushing assembly 10. It will be observed that the recesses 15 are open at the lower outward ends thereof as shown at 54 in order that any mud fluid or other foreign matter which enters the recesses 15 may escape laterally by centrifugal force as the bushing rotates.

In the modified form of my invention shown in Figure 6, four rollers are provided for driving a square kelly, not shown. Each of these roller assemblies 23a are substantially the same as the assemblies 23 previously described, and they are clamped into position between the cover 12a and body 11a in the same manner. The axis of the drive roller 24a is offset radially outwardly with respect to the center line of the trunnions 29a and 30a. Each shaft 28a may be inverted by turning it through one-half revolution about its axis from the position shown. This enables the same roller assembly 23a to be employed for any one of two different sizes of kellys. For the larger kellys the trunnions assume the position shown in Figure 6. For the smaller kellys the trunnions are inverted to bring the drive rollers 23a closer together. When a small kelly is employed a correspondingly smaller wiper ring 18a is used.

Having fully described my invention, it is to be understood that I do not wish to be limited to the details herein set forth, but my invention is of the full scope of the appended claim.

I claim:

In a roller drive bushing for a kelly, the combination of: a body having horizontal clamping surfaces, a cover cooperating with the body to define a central opening and a series of recesses radiating from said central opening, the cover having horizontal clamping surfaces facing the clamping surfaces on said body, a plurality of drive roller assemblies each including a stationary shaft having a central cylindrical portion, a kelly-contacting drive roller rotatably mounted on each of said central cylindrical portions, each roller extending into one of said recesses, each shaft having laterally extending generally rectangular trunnions projecting from opposite ends of the central cylindrical portion, the trunnions being offset with respect to the roller axis, each trunnion having vertical side faces, and parallel top and bottom surfaces confronting the horizontal clamping surfaces on said body and cover, respectively, shoulder means on the body disposed radially outwardly of said trunnions a predetermined distance from the center of said central opening and engaging the adjacent vertical side faces of said trunnions to form fixed abutments to positively limit radial outward movement of said drive roller assemblies relative to said central opening, shoulder means on said body at the radially inner side faces of said trunnions and bordering on the peripheral edge of said central opening, cooperating with said first-mentioned shoulder means to form pockets for said trunnions, both of said shoulder means being of a height less than the vertical side faces of said trunnions, torque-receiving means on the body whereby it may be rotated about a central axis, and clamp means connecting the body and cover and acting to maintain the horizontal clamping surfaces in engagement with said parallel trunnion surfaces.

References Cited in the file of this patent
UNITED STATES PATENTS

| | | |
|---|---|---|
| 1,656,456 | Trout | Jan. 17, 1928 |
| 2,094,251 | Young | Sept. 28, 1937 |
| 2,312,323 | Derrick | Mar. 2, 1943 |
| 2,312,804 | Derrick | Mar. 2, 1943 |
| 2,346,958 | Abegg | Apr. 18, 1944 |